(12) United States Patent
Titz

(10) Patent No.: US 8,079,180 B2
(45) Date of Patent: Dec. 20, 2011

(54) SEALING, TRIMMING OR GUIDING STRIPS AND REINFORCEMENTS THEREFOR

(75) Inventor: Peter Titz, Monchengladbach (DE)

(73) Assignee: Henniges Automotive Sealing Systems North America, Inc., Dover, DE (US)

( * ) Notice: Subject to any disclaimer, the term of this patent is extended or adjusted under 35 U.S.C. 154(b) by 1194 days.

(21) Appl. No.: 10/535,872

(22) PCT Filed: Nov. 20, 2003
(Under 37 CFR 1.47)

(86) PCT No.: PCT/IB03/05365
§ 371 (c)(1),
(2), (4) Date: Sep. 14, 2007

(87) PCT Pub. No.: WO2004/045882
PCT Pub. Date: Jun. 3, 2004

(65) Prior Publication Data
US 2010/0263293 A1 Oct. 21, 2010

(30) Foreign Application Priority Data
Nov. 21, 2002 (GB) .................................. 0227230.0

(51) Int. Cl.
*E06B 7/16* (2006.01)
(52) U.S. Cl. .............................. 49/490.1; 49/440; 49/441
(58) Field of Classification Search ................. 49/490.1, 49/440, 441
See application file for complete search history.

(56) References Cited

U.S. PATENT DOCUMENTS

| 2,313,419 | A | * | 3/1943 | Bush | 428/122 |
| 3,399,448 | A |   | 9/1968 | Jackson | |
| 4,656,784 | A | * | 4/1987 | Brachmann | 49/490.1 |
| 4,676,856 | A | * | 6/1987 | Shigeki et al. | 156/201 |
| 5,038,521 | A | * | 8/1991 | Andrzejewski et al. | 49/441 |
| 5,150,542 | A | * | 9/1992 | Hannya et al. | 49/441 |
| 6,079,160 | A | * | 6/2000 | Bonds | 49/490.1 |
| 6,726,978 | B2 | * | 4/2004 | Sehr | 428/134 |

FOREIGN PATENT DOCUMENTS

| DE | 37 43 971 A1 | 7/1989 |
| DE | 199 02 543 A1 | 8/2000 |
| DE | 299 24 117 U1 | 2/2002 |
| DE | 101 24 484 | 11/2002 |
| EP | 0 607 813 | 7/1994 |
| FR | 2 633 658 | 1/1990 |
| FR | 2 698 828 | 6/1994 |
| GB | 2 304 772 A | 3/1997 |
| JP | 4314620 | 11/1992 |
| WO | WO 02/057104 | 7/2002 |

* cited by examiner

*Primary Examiner* — Gregory J. Strimbu
(74) *Attorney, Agent, or Firm* — Howard & Howard Attorneys PLLC

(57) ABSTRACT

A sealing, trimming or guiding strip for supporting a pane of window glass in a frame carried by the rear door of a vehicle in the region of the C-pillar of the vehicle. The strip is made of extruded material defining a channel which embracingly grips a flange. The extruded material is extended to form a limb which supports a lip contacting one surface of the window pane. A reinforcing carrier is embedded in the channel shaped extruded material to strengthen the grip on the flange. The carrier is provided with a plurality of transversely directed through slits to enable the carrier to be curved and the carrier has a longitudinally extending unslit region (B) arranged on the outside of the curve.

13 Claims, 3 Drawing Sheets

US 8,079,180 B2

SEALING, TRIMMING OR GUIDING STRIPS AND REINFORCEMENTS THEREFOR

TECHNICAL FIELD

The invention relates to sealing, trimming or guiding strips and reinforcements or carriers therefor.

Strips and carriers embodying the invention, to be described in more detail below by way of example only, may be used in sealing, trimming and guiding window glass in motor vehicle body construction.

BRIEF SUMMARY OF THE INVENTION

According to the invention, there is provided a reinforcing carrier for a sealing, trimming or guiding strip made of flexible material having a channel-shape, the carrier being of channel-shape for embedding in the channel-shaped flexible material, the carrier comprising a plurality of through slits arranged side by side transversely of the carrier and spaced apart from each other along the length of the carrier, there being a plurality of relatively long slits and a plurality of relatively short slits, each relatively long slit being aligned with a respective one of the relatively short slits, all the relatively long slits being positioned in the first one of the side walls of the channel and extending therefrom into the base of the channel but only part-way thereacross, and all the relatively short slits being positioned in the second, opposite, side wall of the channel and not extending into the base of the channel.

According to the invention, there is further provided a sealing, trimming or guiding strip for sealing with respect to a curved part of a bodywork panel in a motor vehicle body, the strip comprising a body portion made of flexible material defining a channel-shape for embracingly gripping a mounting flange or the like to hold the strip adjacent to the bodywork panel, the material of the body portion being integrally extended on one side of the channel-shape to provide integral sealing means for sealing against the bodywork panel, and a resilient reinforcing longitudinally extending channel-shaped carrier embedded in the material of the body portion around the channel-shape therein for increasing the embracing grip of the body portion on the mounting flange, the carrier incorporating a plurality of transverse through slits arranged side-by-side along the length of the carrier, the slits being arranged so that along one side wall of the channel of the carrier there is an unslit region extending along the length of the carrier which also extends into and along the length of the base of the channel of the carrier but only partway across the width of the base, this side wall of the channel of the carrier being embedded within that part of the flexible material of the body portion from which integrally extends the sealing means.

BRIEF DESCRIPTION OF DRAWINGS

Sealing, trimming or guiding strips and carriers therefore for use in vehicles and embodying the invention, will now be described, by way of example only, with reference to the accompanying diagrammatic drawings in which.

DETAILED DESCRIPTION OF THE INVENTION

Figure 1:
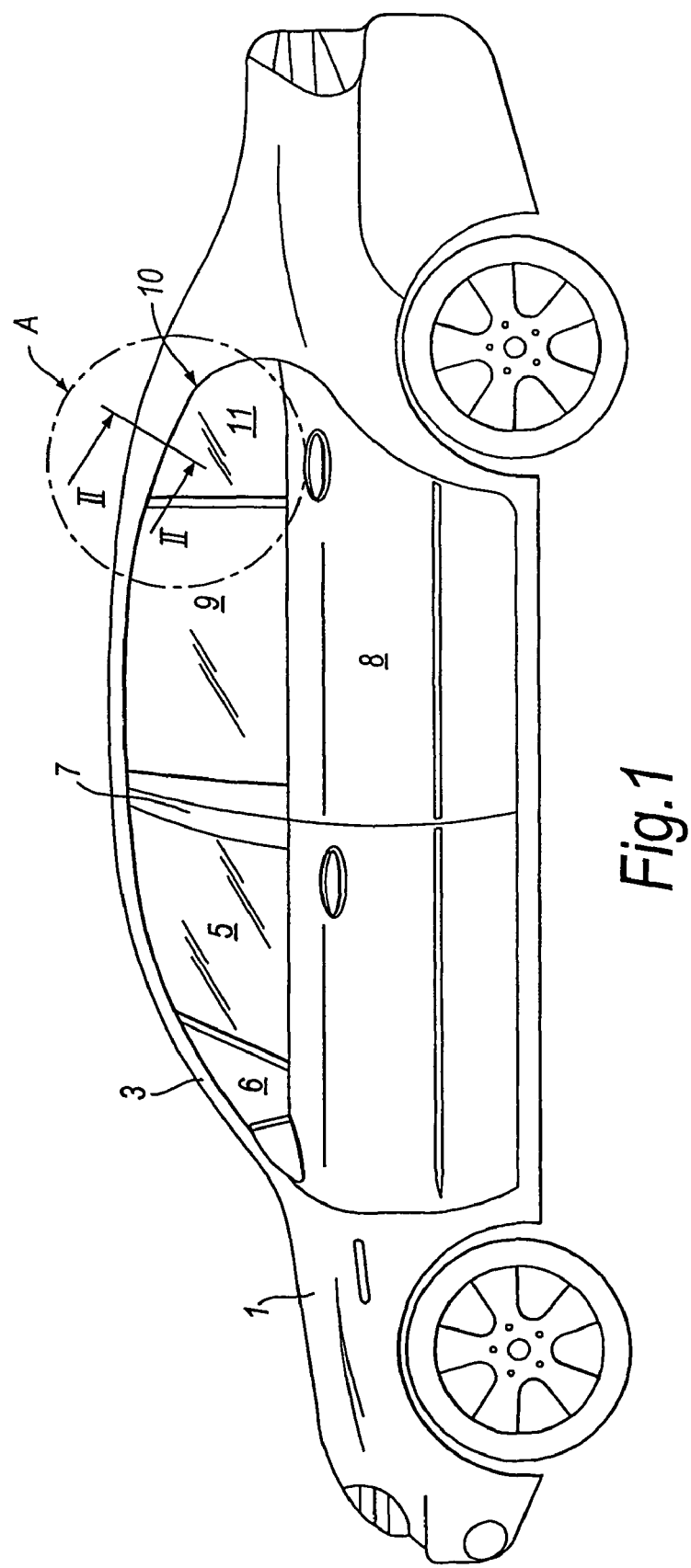
FIG. 1 is a side view of a motor vehicle.

The side elevation of the motor vehicle 1 of FIG. 1 shows the vehicle's A-pillar 3 where the front side window 5 (or front quarter light window 6, if provided) runs adjacent to the vehicle windscreen (not shown). The B-pillar 7 lies between the front side window 5 and the main rear side window 9. It is typical for vehicles having rear doors 8 to include, in addition to the main window 9 (which will normally have a glass pane which may be raised and lowered), a smaller quarter light window 11. The quarter light window 11 generally has a fixed glass pane. The vehicle's C-pillar 10 runs down the rear side of the frame of the opening for the door 8.

The present invention is primarily concerned with the structure and fabrication of a sealing, trimming or guiding strip in the region of the C-pillar 10 and more specifically with such a strip which is mounted on the window frame carried by the door 8 and which receives the glass pane of the quarter-light window 11.

Figure 2:
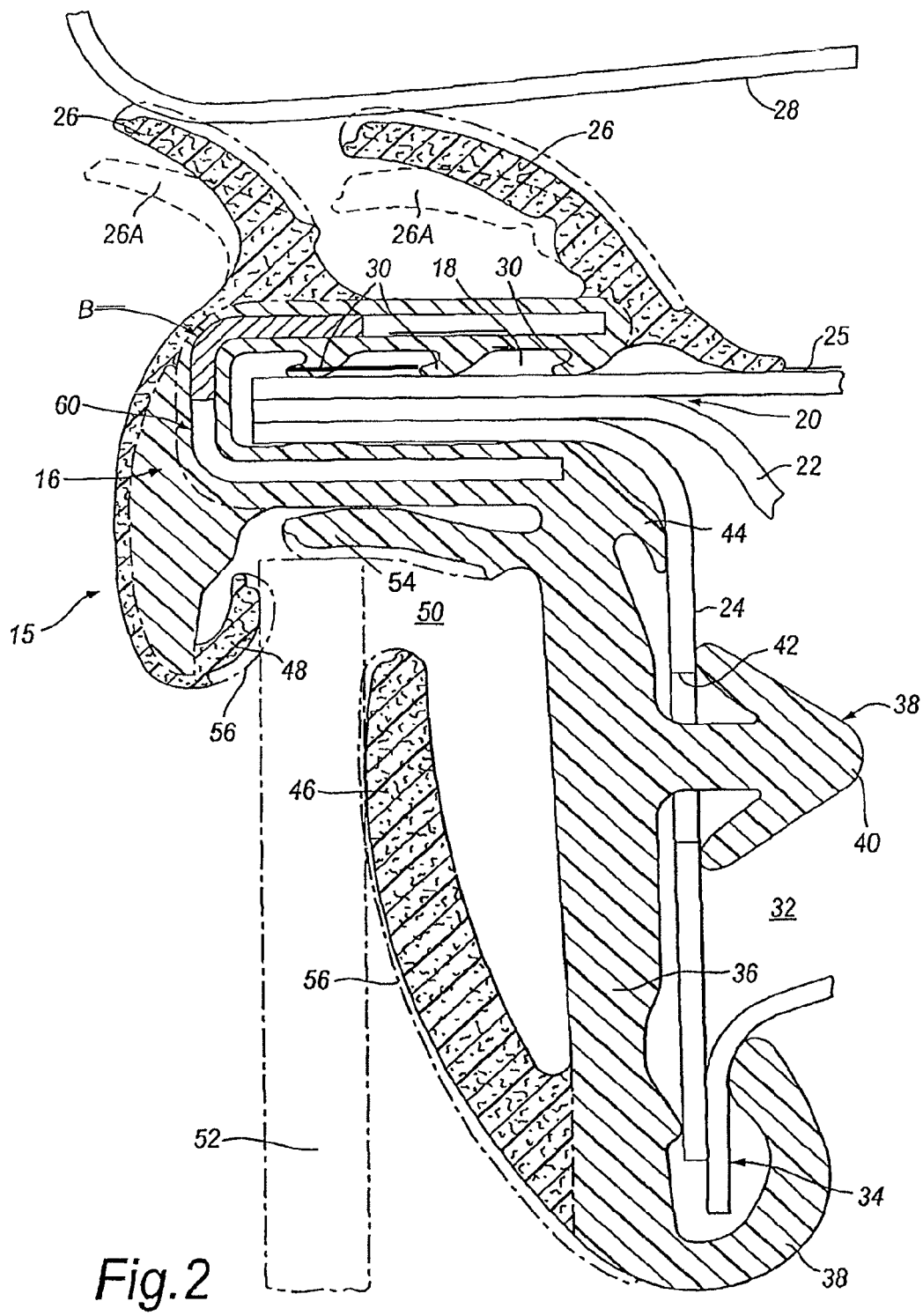
FIG. 2 shows a cross-sectional view of one of the strips, taken along the line II-II of FIG. 1.

FIG. 2 shows a cross-section through such a strip 15 taken on the line II-II of FIG. 1.

The strip 15 comprises extruded plastics or rubber material 16 defining a channel 18 which embraces a flange 20 formed by panels 22,24,25 of the rear door 8 and which define the window frame carried by the door. The uppermost exterior surface of the material defining the channel 18 carries integral resiliently deformable lips 26 which press against a bodywork panel 28 defining the opening for the rear door 8. The bodywork 28 extends along the C-pillar 10 and along the top of the door opening, substantially parallel to the roof of the vehicle 1.

The material 16 is extruded to provide integral resiliently deformable lips 30 within the channel 18 which help to hold the strip securely in position on the flange 20.

The panels 22,24 of the frame of the window are spot-welded (or otherwise attached together) to form the flange 20, then diverge to form a hollow space 32 and come together again to form a further flange 34 where they are again spot-welded (or attached by some other means).

Extended from (and integrally extruded with) the lower side of the channel 18 is a limb 36 having a distal lip 38 which accommodates and resiliently embraces the flange 34. The limb 36 is further clamped to the window frame by means of a resiliently deformable protrusion 38 having an enlarged head portion 40 which is pushed through an aperture 42 in the panel 24 and into the hollow space 32. After passing through the aperture 42, the enlarged head portion 40 resiles and presses against the panel 24 around the edges of the aperture 42.

The extruded material 16 of the strip 15 includes an additional lip 44 which engages the panel 24.

The limb 36 carries a large lip 46 extending towards a lip 48 formed integrally on the extruded material defining the channel 18. Lips 46 and 48 together form a channel or recess 50 for receiving the edge of the window pane 52 of the quarter light window 11. Lip 46 contacts the inside surface of the window pane 520. Lip 48 contacts the outer surface of the window pane 52. A further lip 54 engages the top edge of the window pane 52. Each of the lips 46, 48 and 54 may be provided with a coating of flocked material 56 on the surfaces where they contact the glass 52.

As shown in FIG. 2, the strip 15 also incorporates a channel-shaped reinforcement or carrier 60 which is positioned within the extruded material to embrace that part of the material defining the channel 18. The carrier, to be described in more detail below, may be made of metal or other resilient material, and its resilience helps to ensure that the material of the channel 18 grips the flange 20 tightly.

The carrier 60 is preferably incorporated into the extruded material during the extrusion process, using a cross-head extruder.

The carrier 60 will now be described in more detail with reference to FIGS. 3 and 4.

Figure 4:
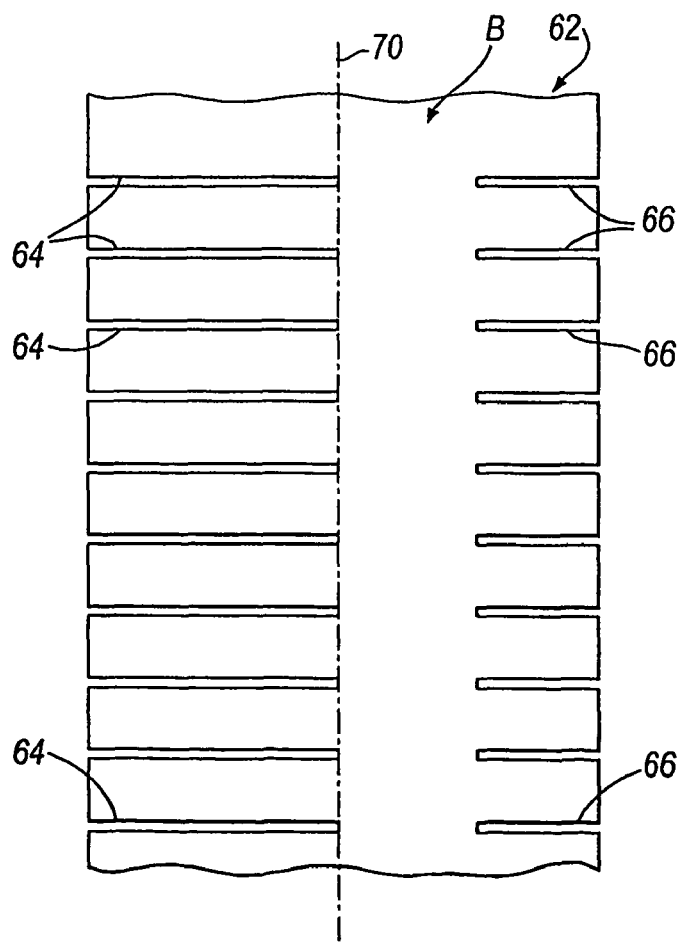
FIG. 4 shows a plan view of a blank used in the manufacture of the carrier of FIG. 3.

The carrier 60 is preferably manufactured from a thin rectangular strip-shaped blank 62 (FIG. 4). This blank is then provided with through slits 64,66 each having a constant width. Slits 64 are longer than the slits 66, and each slit 64 is aligned with a corresponding slot 66. All the slits 64 are of the same length and all the slits 66 are of the same length. The arrangement of the slits is therefore such as to leave an unslit area B which is offset from the centre line 70 of the blank.

The blank 62 may be subjected to a slight longitudinal stretching process so as to convert the slits 64 and 66 into very narrow slots. The stretching process may be carried out by passing the blank through the bight of a pair of rollers, thus compressing the material of the blank slightly.

Figure 3:
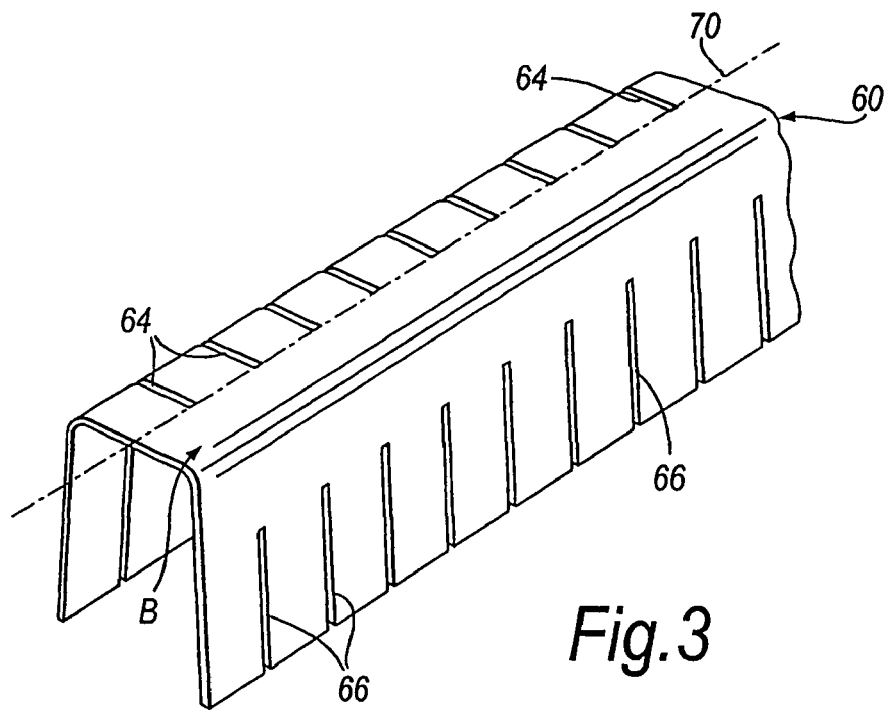
FIG. 3 shows a perspective view of a carrier incorporated in the strip of FIG. 2.

After this stretching process, the blank may then be formed into channel-shape, to have the configuration shown in FIG. 3.

It will be noted that each long slit 64 extends into the (inverted) base of the channel-form shown in FIG. 3, but extends only part-way across the blank—advantageously not more than half way across.

Each shorter slit 66 does not extend at all into the base of the channel-form shown in FIG. 3; as shown in FIG. 3, in this example each short slit 66 extends approximately halfway up the respective side wall of the channel-form.

In FIG. 2, where of course the carrier is shown in cross-section, the asymmetric position of the un-slit region B is apparent.

The asymmetrical arrangement of the carrier 60 is advantageous because it enables the carrier to be bent slightly (in a longitudinal direction), together with the strip 15, so as to match the curved shape of the C-pillar in the region (A, circled in FIG. 1). Because of the asymmetric arrangement of the carrier, it is relatively easy to bend it and it readily retains the resultant curved configuration. The portions of the carrier between the slits 64 (see FIGS. 3 and 4) on the inside of the bend will slide partially over each other as the carrier bends.

If a carrier having a symmetrical configuration is used, and bent into the required curved shape such as by a stretch-bending process, it is found that stresses are set up in the extruded material 16 which can cause the lips 26 to assume the shapes shown dotted at 26A in FIG. 2. These shapes 26A are obviously unsatisfactory because the lips no longer make sealing contact with the roof panel 28. Stretch-bending is also relatively expensive. The use of the carrier 60 shown in FIGS. 3 and 4 therefore overcomes these disadvantages.

The invention claimed is:

1. A reinforcing carrier for a strip made of flexible material and having a channel-shape, the carrier comprising:
a base and first and second side walls with the base and the first and second sidewalls cooperating to define a length and define a generally U-shaped channel for embedding in the channel-shape of the flexible material;
a plurality of through slits arranged in the carrier side by side and spaced apart from each other along the length of the carrier with each of said plurality of through slits having a constant width along its longitudinal dimension, wherein each of said plurality of through slits extends transversely to a longitudinal axis of the carrier, wherein said plurality of through slits comprises a plurality of relatively long slits and a plurality of relatively short slits, each relatively long slit being aligned with a respective one of the relatively short slits, all the relatively long slits being positioned only in the first side wall and the base of the carrier and extend to a centerline of the base of the carrier, and all the relatively short slits being positioned only in the second side wall of the carrier and not extending into the base of the carrier.

2. The carrier according to claim 1, wherein each relatively long slit extends to a distal edge of the first side wall of the carrier.

3. The carrier according to claim 1, wherein each relatively short slit extends from a distal edge of the second side wall of the carrier to approximately a mid-point of said second side wall.

4. The carrier according to claim 1, wherein the plurality of through slits are slots produced by stretching the carrier.

5. A strip for mounting to a mounting flange, the strip comprising;
a carrier and a body portion with the carrier comprising:
a base and first and second side walls with said base and said first and second sidewalls cooperating define a generally U-shaped length and to define a channel,
a plurality of through slits arranged in the carrier side by side and spaced apart from each other along the length of the carrier with each of the plurality of through slits having a constant width along its longitudinal dimension, wherein each of said plurality of through slits extends transverse to a longitudinal axis of the carrier,
wherein said plurality of through slits comprises a plurality of relatively long slits and a plurality of relatively short slits, each relatively long slit being aligned with a respective one of the relatively short slits, all the relatively long slits being positioned only in the first side wall and the base of the carrier and extend to a centerline of the base of the carrier, and all the relatively short slits being positioned only in the second side wall of the carrier and not extending into the base of the carrier,
the body portion being made of a flexible material and having a channel-shaped portion for embracingly gripping the mounting flange,
the carrier being embedded within the channel-shaped portion of the body portion for reinforcing the gripping of the strip on the mounting flange.

6. The strip according to claim 5, wherein the strip is bent into a curve such that said first side wall of the carrier is on an inside of the curve and said second side wall of the carrier is on an outside of the curve.

7. The strip according to claim 6, wherein the body portion includes one or more outwardly directed sealing lips.

8. The strip according to claim 6, wherein the body portion includes a channel for receiving a window pane.

9. A strip for mounting to a mounting flange for sealing between the mounting flange and a curved part of a bodywork panel in a motor vehicle body, the strip comprising:
a body portion made of flexible material defining a channel-shape for embracingly gripping the mounting flange to hold the strip adjacent to the bodywork panel, wherein the flexible material of the body portion is integrally extended on one side of the channel-shape to provide an integral seal for sealing against the bodywork panel:
a resilient reinforcing longitudinally extending carrier embedded in the body portion for increasing the embracing grip of the body portion on the mounting flange, the carrier comprising a base, and first and second side walls defining a length and a generally U-shaped channel, the carrier comprising a plurality of through slits arranged in the carrier side-by-side along the length of the carrier with each of said plurality of through slits having a constant width along its longitudinal dimension, wherein each of said plurality of through slits extends transverse to a longitudinal axis of the carrier, and the plurality of through slits being arranged so that the carrier includes an unslit region extending the length of the carrier along the second side wall and base of the carrier, wherein the unslit region extends partway across a width of the base to a centerline of the base, wherein said plurality of through slits comprises a plurality of relatively long slits and a plurality of relatively short slits, each relatively long slit being aligned with a respective one of the relatively short slits, all the relatively long slits being positioned only in the first side wall and the base of the carrier and extend to the centerline of the base of the carrier, and all the relatively short slits being positioned only in the second side wall of the carrier and not extending into the base of the carrier, and the second side wall of the carrier being embedded within a portion of the flexible material of the body portion from which the seal integrally extends.

10. The strip according to claim 9, wherein the plurality of relatively long slits each extend from the centerline to a distal edge of the first side wall and the relatively short slits each extend from the unslit region to a distal edge of the second side wall.

11. The strip according to claim 10, wherein each slit is a slot.

12. The strip according to claim 9, wherein said first side wall is embedded in the body portion, and the body portion is integrally extended to define a further channel for receiving a pane of window glass.

13. The strip according to claim 9, wherein the flexible material is an extruded plastics or a rubber material.

* * * * *